United States Patent
Huang

(10) Patent No.: US 9,710,374 B2
(45) Date of Patent: Jul. 18, 2017

(54) DATA WRITING METHOD, MEMORY CONTROLLER AND MEMORY STORAGE DEVICE

(71) Applicant: PHISON ELECTRONICS CORP., Miaoli (TW)

(72) Inventor: Yi-Hsiang Huang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 450 days.

(21) Appl. No.: 13/831,977

(22) Filed: Mar. 15, 2013

(65) Prior Publication Data

US 2014/0215132 A1 Jul. 31, 2014

(30) Foreign Application Priority Data

Jan. 31, 2013 (TW) .............................. 102103797 A

(51) Int. Cl.
*G06F 12/00* (2006.01)
*G06F 12/02* (2006.01)

(52) U.S. Cl.
CPC .. *G06F 12/0246* (2013.01); *G06F 2212/7201* (2013.01)

(58) Field of Classification Search
CPC ................ G06F 12/02; G06F 12/0246; G06F 2212/7201
See application file for complete search history.

(56) References Cited

U.S. PATENT DOCUMENTS

| 8,621,139 B2 * | 12/2013 | Chu ..................... G06F 12/0246 711/103 |
| 2009/0307413 A1 | 12/2009 | Chu |
| 2010/0011153 A1 * | 1/2010 | Yeh ..................... G06F 12/0246 711/103 |

(Continued)

FOREIGN PATENT DOCUMENTS

| CN | 101673245 | 3/2010 |
| TW | 201101304 | 1/2011 |

OTHER PUBLICATIONS

"Office Action of Taiwan Counterpart Application", issued on Jan. 21, 2015, p. 1-p. 7, in which the listed references were cited.

*Primary Examiner* — David X Yi
*Assistant Examiner* — Tahilba Puche
(74) *Attorney, Agent, or Firm* — Jianq Chyun IP Office

(57) ABSTRACT

A data writing method, a memory controller, and a memory storage device are provided. The method is applied to control a rewritable non-volatile memory module that includes two memory units. The method includes: configuring a plurality of logical addresses and mapping the logical addresses to at least parts of physical erasing units in the two memory units; receiving a writing command from a host system to instruct to write data into one of the logical addresses; writing the data into a physical erasing unit in the two memory units; determining one of the memory units where the physical erasing unit belongs to; if the physical erasing unit belongs to one of the memory units, erasing another physical erasing unit in the other memory unit while writing the data into the physical erasing unit. Accordingly, a speed of writing data into the memory storage device by the host system is accelerated.

19 Claims, 11 Drawing Sheets

(56) References Cited

U.S. PATENT DOCUMENTS

| | | | | |
|---|---|---|---|---|
| 2010/0064111 | A1* | 3/2010 | Kunimatsu | G06F 12/08 |
| | | | | 711/161 |
| 2011/0161563 | A1* | 6/2011 | Chang | G06F 12/0246 |
| | | | | 711/103 |
| 2011/0197014 | A1* | 8/2011 | Yeh | G06F 12/0246 |
| | | | | 711/103 |
| 2012/0198186 | A1* | 8/2012 | Koshiyama | G06F 12/0246 |
| | | | | 711/159 |

* cited by examiner

DATA WRITING METHOD, MEMORY CONTROLLER AND MEMORY STORAGE DEVICE

CROSS-REFERENCE TO RELATED APPLICATION

This application claims the priority benefit of Taiwan application serial no. 102103797, filed on Jan. 31, 2013. The entirety of the above-mentioned patent application is hereby incorporated by reference herein and made a part of this specification.

BACKGROUND

Technology Field

The invention relates to a data writing method; more particularly, the invention relates to a data writing method, a memory controller, and a memory storage device for a rewritable non-volatile memory module.

Description of Related Art

The rapid growth of digital cameras, mobile phones, and MP3 players in recent years leads to a drastic increase in consumers' demand for storage media. A rewritable non-volatile memory module (e.g., a flash memory) is characterized by its data non-volatility, low power consumption, small volume, and non-mechanical structure, and thus the rewritable non-volatile memory module is suitable for being embedded in the aforementioned exemplary portable multimedia devices.

In most cases, a rewritable non-volatile memory module may be coupled to a host system through a transmission interface, and the host system may write data into the rewritable non-volatile memory module through the transmission interface. Besides, the rewritable non-volatile memory module has a plurality of channels therein, and thereby data may be written into the rewritable non-volatile memory module in an expedited manner. Given that the speed of writing data into the rewritable non-volatile memory module is greater than the transmission speed of the transmission interface, however, the speed at which the host system writes data into the rewritable non-volatile memory module may merely be dependent on the transmission speed of the transmission interface. Accordingly, how to further accelerate the data writing speed of the host system under said circumstances is one of the main concerns of people skilled in the pertinent art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a data writing method, a memory controller, and a memory storage device, whereby the speed of writing data into the memory storage device by a host system may be accelerated.

In an exemplary embodiment of the invention, a data writing method for controlling a rewritable non-volatile memory module is provided. The rewritable non-volatile memory module includes a first memory unit and a second memory unit, the first memory unit includes a plurality of first physical erasing units, and the second memory unit includes a plurality of second physical erasing units. The data writing method includes: configuring a plurality of logical addresses and mapping the logical addresses to at least part of the first physical erasing units and at least part of the second physical erasing units; receiving a writing command from a host system, wherein the writing command instructs to write first data into a first logical address of the logical addresses; selecting a third physical erasing unit from the first and second physical erasing units and writing the first data into the third physical erasing unit; determining whether the third physical erasing unit belongs to the first memory unit; if the third physical erasing unit belongs to the first memory unit, erasing one of the second physical erasing units while writing the first data into the third physical erasing unit.

From another perspective, in an exemplary embodiment of the invention, a memory storage device that includes a connector, a rewritable non-volatile memory module, and a memory controller is provided. The connector is configured to couple to a host system. The rewritable non-volatile memory module includes a first memory unit and a second memory unit, the first memory unit includes a plurality of first physical erasing units, and the second memory unit includes a plurality of second physical erasing units. The memory controller is coupled to the connector and the rewritable non-volatile memory module for configuring a plurality of logical addresses and mapping the logical addresses to at least part of the first physical erasing units and at least part of the second physical erasing units. The memory controller is also configured to receive a writing command from a host system, wherein the writing command instructs to write first data into a first logical address of the logical addresses. The memory controller is also configured to select a third physical erasing unit from the first and second physical erasing units and write the first data into the third physical erasing unit. The memory controller is also configured to determine whether the third physical erasing unit belongs to the first memory unit. If the third physical erasing unit belongs to the first memory unit, the memory controller is configured to erase one of the second physical erasing units while writing the first data into the third physical erasing unit.

From yet another perspective, in an exemplary embodiment of the invention, a memory controller for controlling a rewritable non-volatile memory module is provided. The memory controller includes a host interface, a memory interface, and a memory management circuit. The host interface is configured to couple to a host system. The memory interface is configured to couple to the rewritable non-volatile memory module. The rewritable non-volatile memory module includes a first memory unit and a second memory unit, the first memory unit includes a plurality of first physical erasing units, and the second memory unit includes a plurality of second physical erasing units. The memory management circuit is coupled to the host interface and the memory interface for configuring a plurality of logical addresses and mapping the logical addresses to at least part of the first physical erasing units and at least part of the second physical erasing units. The memory management circuit is also configured to receive a writing command from a host system, wherein the writing command instructs to write first data into a first logical address of the logical addresses. The memory management circuit is also configured to select a third physical erasing unit from the first and second physical erasing units and write the first data into the third physical erasing unit. The memory management circuit is also configured to determine whether the third physical erasing unit belongs to the first memory unit. If the third physical erasing unit belongs to the first memory unit, the memory management circuit is configured to erase one of the second physical erasing units while writing the first data into the third physical erasing unit.

In view of the foregoing, according to the data writing method, the memory controller, and the memory storage device described in the exemplary embodiments of the invention, the data writing operation and the data erasing operation may be performed simultaneously, and thereby the speed of writing data into the memory storage device by a host system may be accelerated.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
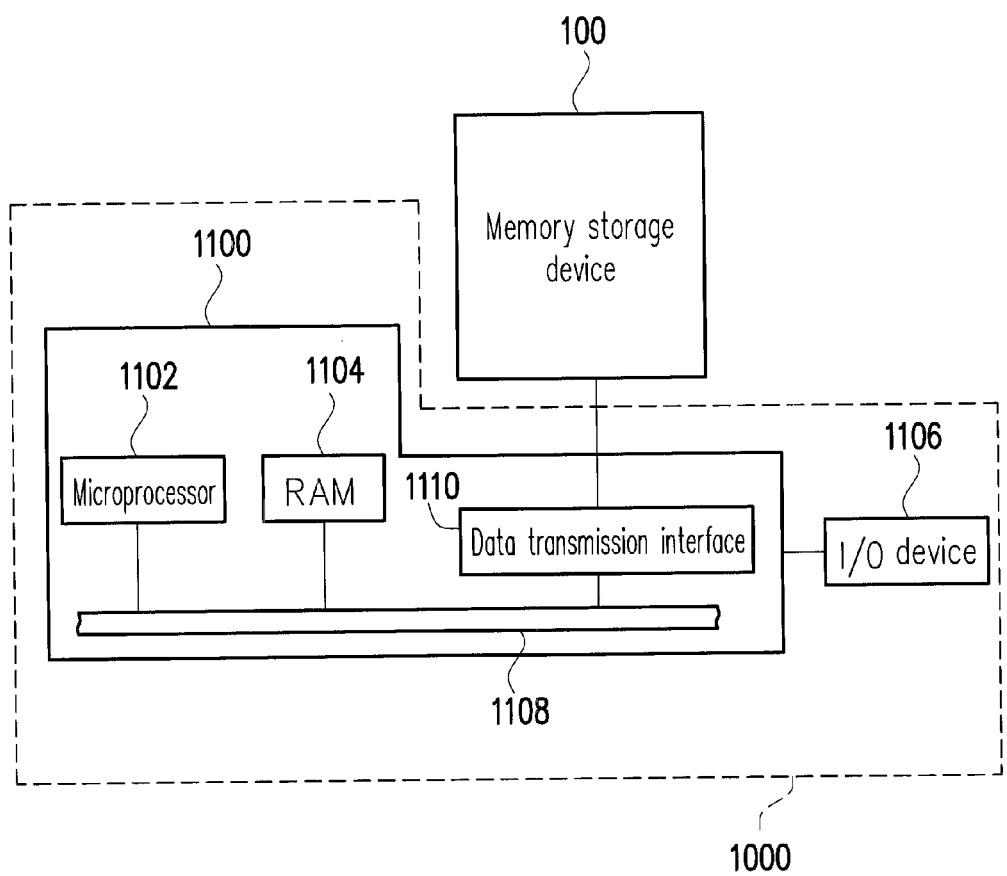
FIG. 1A illustrates a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage device (also referred to as a memory storage system) typically includes a rewritable non-volatile memory module and a controller (also referred to as a control circuit). The memory storage device is usually used together with a host system, such that the host system is able to write data into or read data from the memory storage device.

FIG. 1A illustrates a host system and a memory storage device according to an exemplary embodiment of the invention.

Figure 1B:
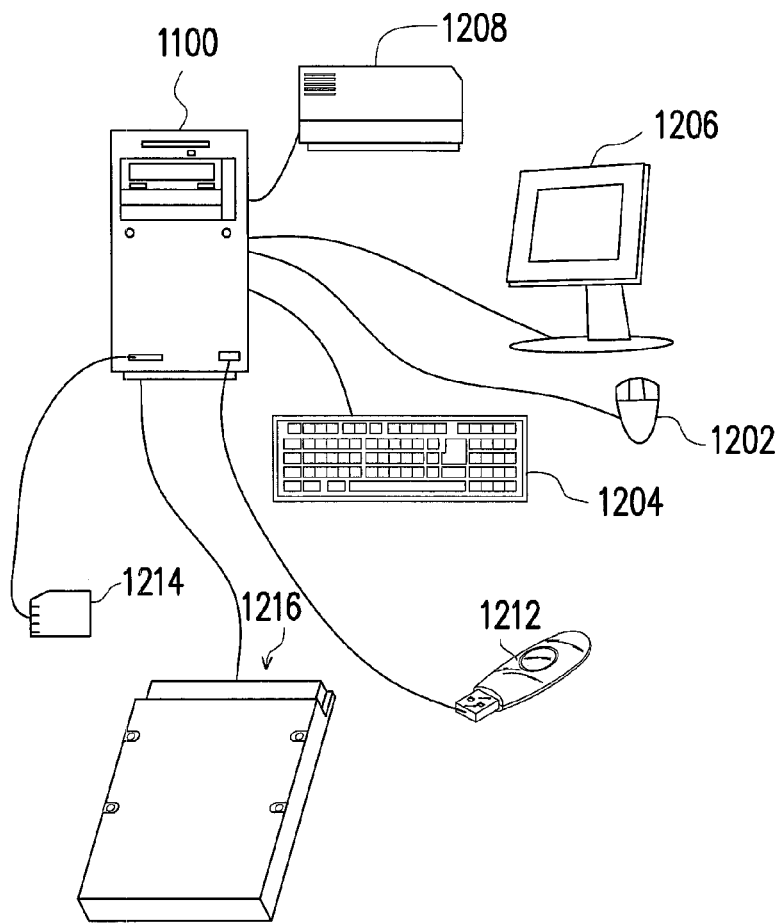
FIG. 1B schematically illustrates a computer, an input/output (I/O) device, and a memory storage device according to an exemplary embodiment of the invention.

With reference to FIG. 1A, the host system 1000 normally includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to that illustrated in FIG. 1B and may further include other devices.

In an exemplary embodiment of the invention, the memory storage device 100 is coupled to other components of the host system 1000 through the data transmission interface 1110. Through operating the microprocessor 1102, the RAM 1104, and the I/O device 1106, the data can be written into or read from the memory storage device 100. For instance, the memory storage device 100 may be a rewritable non-volatile memory storage device, such as a portable drive 1212, a memory card 1214, or a solid state drive (SSD) 1216 as illustrated in FIG. 1B.

Figure 1C:
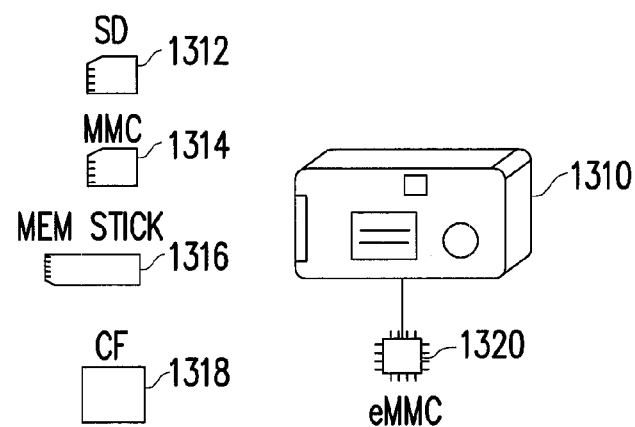
FIG. 1C schematically illustrates a host system and a memory storage device according to an exemplary embodiment of the invention.

Generally, the host system 1000 may be any system that can be substantively operated together with the memory storage device 100 to store data. In the exemplary embodiment, although the host system 1000 is described as a computer system, the host system 1000 in another exemplary embodiment of the invention may be a digital camera, a video camera, a communication device, an audio player, a video player, and so forth. For instance, if the host system is a digital camera (video camera) 1310, the rewritable non-volatile memory storage device is a secure digital (SD) card 1312, a multi media card (MMC) 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

Figure 2:
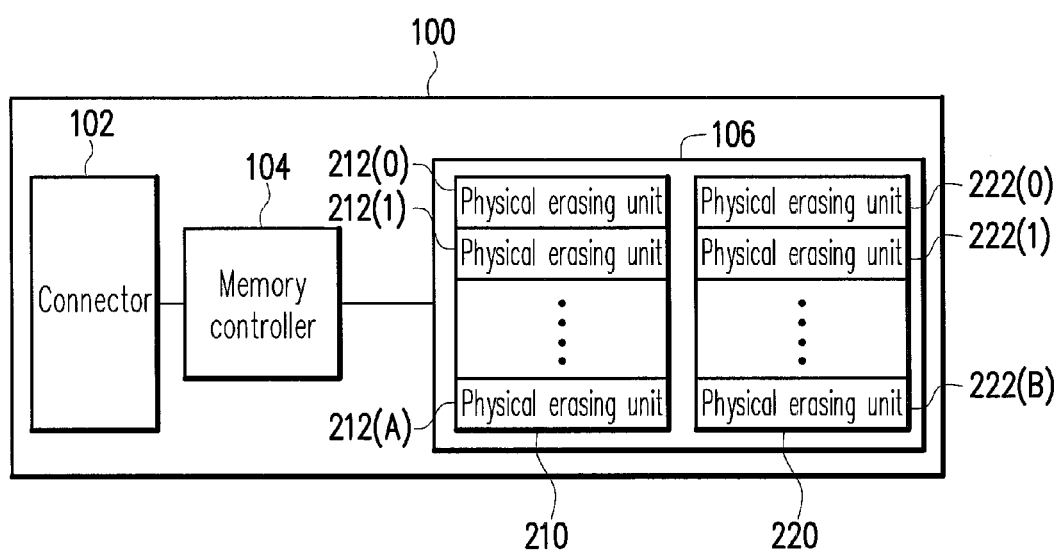
FIG. 2 is a simple block diagram illustrating the memory storage device depicted in FIG. 1A.

FIG. 2 is a schematic block diagram illustrating the memory storage device depicted in FIG. 1A.

With reference to FIG. 2, the memory storage device 100 includes a connector 102, a memory controller 104, and a rewritable non-volatile memory module 106.

In the present exemplary embodiment, the connector 102 complies with the Peripheral Component Interconnect (PCI) Express standard; however, it should be understood that the invention is not limited thereto, and the connector 102 may also comply with the Serial Advanced Technology Attachment (SATA) standard, the Parallel Advanced Technology Attachment (PATA) standard, the Institute of Electrical and Electronic Engineers (IEEE) 1394 standard, the Universal Serial Bus (USB) standard, the Secure Digital (SD) standard, the Ultra High Speed-I (UHS-I) interface standard, the Ultra High Speed-II (UHS-II) interface standard, the Memory Stick (MS) interface standard, the Multi Media Card (MMC) interface standard, the Embedded Multimedia Card (eMMC) interface standard, the Universal Flash Storage (UFS) interface standard, the Compact Flash (CF) interface standard, the Integrated Device Electronics (IDE) standard, or any other suitable standard.

The memory controller 104 serves to execute a plurality of logic gates or control commands implemented in form of hardware or firmware and perform various data operations (e.g., data writing, data reading, and data erasing operations) on the rewritable non-volatile memory module 106 according to commands issued by the host system 1000.

The rewritable non-volatile memory module 106 is coupled to the memory controller 104 and configured to store data written by the host system 1000. The rewritable non-volatile memory module 106 has a memory unit 210 (also referred to as a first memory unit) and memory unit 220 (also referred to as a second memory unit). The memory unit 210 includes physical erasing units 212(0) to 212(A) (also referred to as first physical erasing units), and the memory unit 220 includes physical erasing units 222(0) to 222(B) (also referred to as second physical erasing units). Each of the memory units 210 and 220 may independently read, write, and erase data. For instance, the memory unit 210 is coupled to the memory controller 104 through at least one first channel, and the memory unit 220 is coupled to the memory controller 104 through at least one second channel. Here, the first channel is different from the second channel. Alternatively, the memory unit 210 is controlled by at least one first enabling signal (also referred to as a CE signal), and the second memory unit 220 is controlled by at least one second enabling signal. Here, the first enabling signal is different from the second enabling signal. That is, while the memory unit 210 is reading, writing, or erasing data, the memory unit 220 may also be reading, writing, or erasing data, and the operations carried out by the memory unit 210 may be distinct from the operations carried out by the memory unit 220. From another perspective, the memory unit 210 and the memory unit 220 may respectively belong to different memory die or belong to the same memory die, which should however not be construed as a limitation to the invention.

Each of the physical erasing units includes a plurality of physical programming units, and the physical programming units belonging to the same physical erasing unit may be written independently and be erased simultaneously. For instance, each physical erasing unit is composed of 128 physical programming units. However, it should be understood that the invention is not limited thereto. Each physical erasing unit may be composed of 64 physical programming units, 256 physical programming units, or by any number of physical programming units.

Specifically, the physical erasing unit is the least unit in which the data are erased. That is to say, each physical erasing unit contains the least number of memory cells which are erased all together. The physical programming unit is the least unit in which the data are programmed, i.e., the physical programming unit is the least unit for the data writing operation. Each physical programming unit usually includes a data bit area and a redundant bit area. The data bit area includes a plurality of physical access addresses for storing user data, and the redundant bit area is used for storing system data (e.g., control information and error correcting codes, ECC codes). In the present exemplary embodiment, the data bit area of each of the physical programming units includes 4 physical access addresses, and the size of each of the physical access addresses is 512 bytes (B). However, in other exemplary embodiments, the data bit area may also include 8, 16, a greater or smaller number of physical access addresses, and the invention does not pose a limitation to the size and the number of the physical access addresses. For instance, the physical erasing units may refer to physical blocks, and the physical programming units may refer to physical pages or physical sectors.

In the present exemplary embodiment, the rewritable non-volatile memory module 106 is a multi-level cell (MLC) NAND flash memory module (i.e., a flash memory module capable of storing data of at least 2 bits in one memory cell). However, the invention is not limited thereto, and the rewritable non-volatile memory module 106 may also be a single-level cell (SLC) NAND flash memory module, a trinary-level cell (TLC) NAND flash memory module, any other flash memory module, or any other memory module with the same characteristics.

Figure 3:
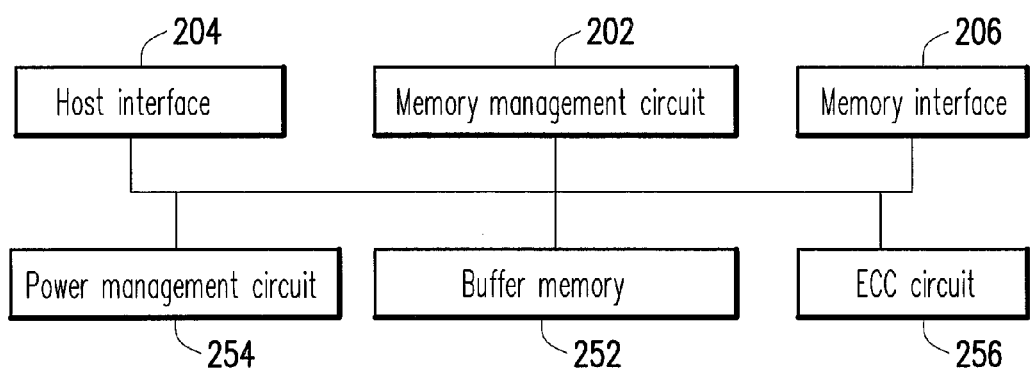
FIG. 3 is a simple block diagram illustrating a memory controller according to an exemplary embodiment of the invention.

FIG. 3 is a schematic block diagram illustrating a memory controller according to an exemplary embodiment of the invention.

With reference to FIG. 3, the memory controller 104 includes a memory management circuit 202, a host interface 204, and a memory interface 206.

The memory management circuit 202 is configured to control the overall operation of the memory controller 104. Particularly, the memory management circuit 202 has a plurality of control instructions; when the memory storage device 100 is in operation, the control instructions are executed to perform data writing, reading, and erasing operations. The operations of the memory management circuit 202 are described below; in case that the operations of the memory management circuit 202 are similar to those of the memory controller 104, the relevant descriptions will be omitted.

In the present exemplary embodiment, the control instructions of the memory management circuit 202 are implemented in a firmware form. For instance, the memory management circuit 202 has a microprocessor unit (not shown) and a read-only memory (ROM, not shown), and these control instructions are burnt into the ROM. When the memory storage device 100 is in operation, the control instructions are executed by the microprocessor unit to write, read, and erase data.

In another exemplary embodiment of the invention, the control instructions of the memory management circuit 202 are stored in a specific area of the rewritable non-volatile memory module 106 (for instance, a system area of the memory module exclusively used for storing system data) as program codes. Additionally, the memory management circuit 202 has a microprocessor unit (not shown), a ROM (not shown), and a RAM (not shown). In particular, the ROM has boot codes, and when the memory controller 104 is enabled, the microprocessor unit first executes the boot codes to load the control instructions from the rewritable non-volatile memory module 106 into the RAM of the memory management circuit 202. The microprocessor unit then runs the control instructions to write, read, and erase data.

Moreover, the control instructions of the memory management circuit 202 may also be implemented in a hardware form according to another exemplary embodiment of the invention. For instance, the memory management circuit 202 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured to manage physical erasing units of the rewritable non-volatile memory module 106; the memory writing unit is configured to issue a writing command to the rewritable non-volatile memory module 106 for writing data thereto; the memory reading unit is configured to issue a reading command to the rewritable non-volatile memory module 106 for reading data therefrom; the memory erasing unit is configured to issue an erasing command to the rewritable non-volatile memory module 106 for erasing data therefrom; the data processing unit is configured to process data to be written to the rewritable non-volatile memory module 106 or data read from the rewritable non-volatile memory module 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface 204 complies with the PCI Express standard. However, it should be understood that the invention is not limited thereto, and the host interface 204 may comply with the SATA standard, the PATA standard, the IEEE 1394 standard, the USB standard, the SD standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory module 106. Namely, data to be written into the rewritable non-volatile memory module 106 may be converted by the memory interface 206 into a format acceptable to the rewritable non-volatile memory module 106.

In an exemplary embodiment of the invention, the memory controller 104 further includes a buffer memory 252, a power management circuit 254, and an error checking and correcting (ECC) circuit 256.

The buffer memory 252 is coupled to the memory management circuit 202 and configured to temporarily store data and commands received from the host system 1000 or data received from the rewritable non-volatile memory module 106.

The power management circuit 254 is coupled to the memory management circuit 202 and configured to control the power supply of the memory storage device 100.

The ECC circuit 256 is coupled to the memory management circuit 202 and configured to perform an ECC procedure to ensure data accuracy. To be specific, when the memory management circuit 202 receives a writing command from the host system 1000, the ECC circuit 256 generates an ECC code for data corresponding to the writing command, and the memory management circuit 202 writes the data and the corresponding ECC code into the rewritable non-volatile memory module 106. Thereafter, when reading the data from the rewritable non-volatile memory module 106, the memory management circuit 202 simultaneously reads the ECC code corresponding to the data, and the ECC circuit 256 performs the ECC procedure on the read data according to the corresponding ECC code.

Figure 4:
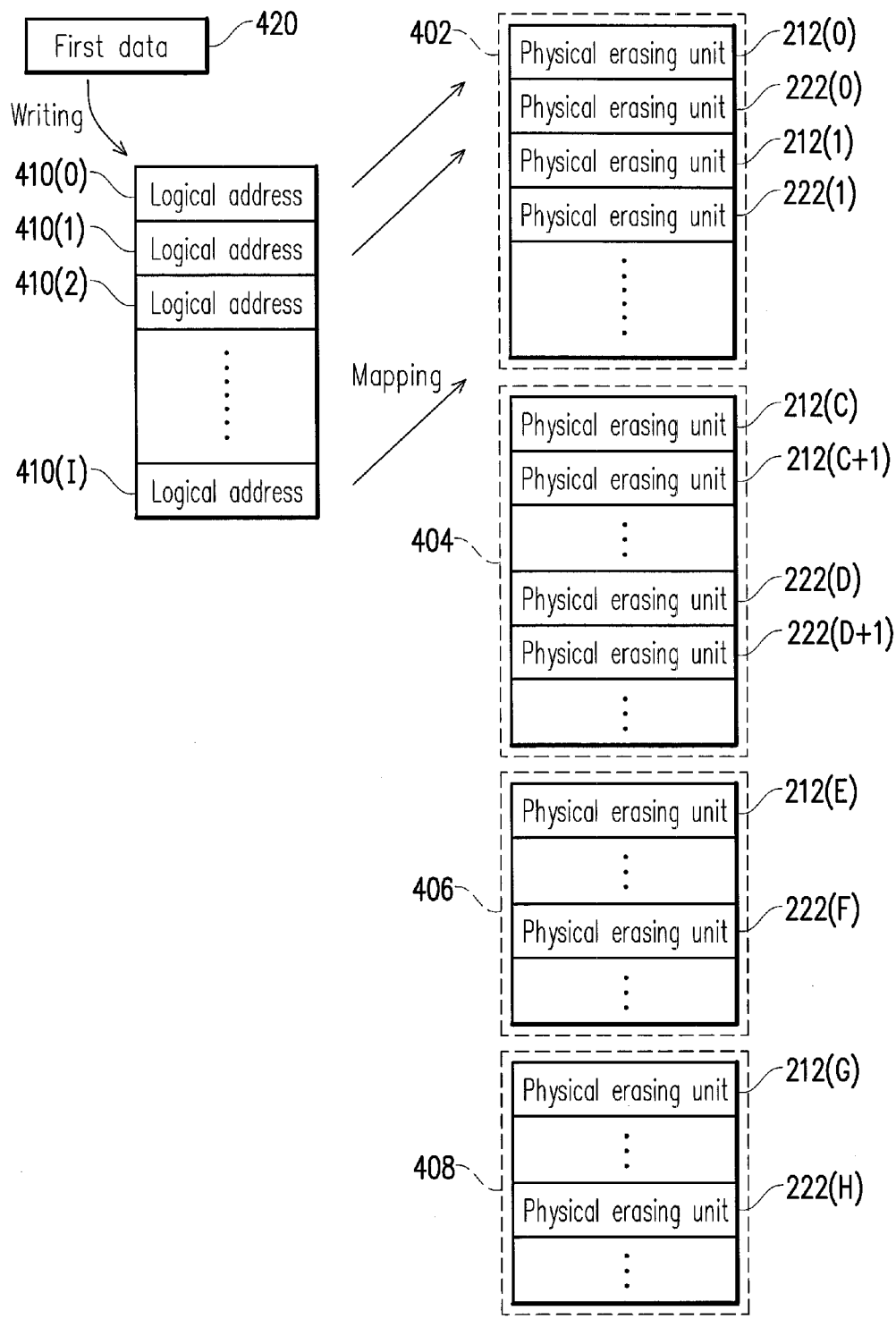
FIG. 4 schematically illustrates an example of managing a rewritable non-volatile memory module according to an exemplary embodiment of the invention.

FIG. 4 schematically illustrates an example of managing a rewritable non-volatile memory module according to an exemplary embodiment of the invention.

It should be understood that the terms used herein for describing the operations (such as "group," "select," and "associate") performed on the physical erasing units of the rewritable non-volatile memory module 106 refer to logical operations performed on these physical erasing units. Namely, the physical erasing units in the rewritable non-volatile memory module 106 are only logically operated, and the actual positions of the physical erasing units in the rewritable non-volatile memory module 106 are not changed.

With reference to FIG. 4, the memory controller 104 logically groups the physical erasing units 212(0) to 212(A) and 222(0) to 222(B) into several areas, such as a data area 402, a spare area 404, a system area 406, and a replacement area 408.

The physical erasing units logically belonging to the data area 402 and the spare area 404 are used for storing data from the host system 1000. To be specific, the physical erasing units belonging to the data area 402 are considered to have been used for storing data, and the physical erasing units belonging to the spare area 404 are used for substituting the physical erasing units belonging to the data area 402. Hence, the physical erasing units in the spare area 404 are either blank or available units (i.e., no data are recorded in these units or data recorded in these units are marked as invalid data). That is, an erasing operation is already performed on the physical erasing units belonging to the spare area 404, or before a physical erasing unit belonging to the spare area 404 is selected for storing data, an erasing operation is performed on the selected physical erasing unit. As such, the physical erasing units belonging to the spare area 404 are available physical erasing units.

The physical erasing units logically belonging to the system area 406 are used for recording system data; here, the system data include information related to a manufacturer and a model of a memory chip, the number of the physical erasing units in the memory chip, the number of physical programming units in each memory chip, and so forth.

The physical erasing units logically belonging to the replacement area 408 are replacement physical erasing units. For instance, after the rewritable non-volatile memory module 106 is manufactured in the factory, 4% of the physical erasing units are reserved for replacement. That is to say, when any physical erasing unit belonging to the data area 402, the spare area 404, and the system area 406 is damaged, the physical erasing unit reserved in the replacement area 440 serves to replace the damaged physical erasing unit (i.e. a bad physical erasing unit). Thus, if there are still normal physical erasing units in the replacement area 408, and a physical erasing unit is damaged, the memory controller 104 selects one of the normal physical erasing units from the replacement area 408 to replace the damaged physical erasing unit. If there is no normal physical erasing unit in the replacement area 408, and a physical erasing unit is damaged, the memory controller 104 announces that the entire memory storage device 100 is in a write-protect mode, and thus no more data can be written into the memory storage device 100. According to another exemplary embodiment, the replacement area 408 and the spare area 404 may share the physical erasing units that contain invalid data.

In particular, the number of physical erasing units respectively belonging to the data area 402, the spare area 404, the system area 406, and the replacement area 408 may vary according to different memory specifications. Additionally, it has to be understood that the grouping relation of associating the physical erasing units with the data area 402, the spare area 404, the system area 406, and the replacement area 408 is dynamically changed during the operation of the memory storage device 100. For instance, when a physical erasing unit belonging to the spare area 404 is damaged and replaced by a physical erasing unit belonging to the replacement area 408, the physical erasing unit originally belonging to the replacement area 408 is associated with the spare area 404. In the present exemplary embodiment, the system area 406 and the replacement area 408 include parts of the physical erasing units in the memory unit 210 and the memory unit 220. In other exemplary embodiments, however, the system area 406 and the replacement area 408 may merely include the physical erasing units in the memory unit 210 or those in the memory unit 220, and the invention is not limited thereto.

The memory controller 104 configures logical addresses 410(0) to 410(I), which is conducive to data access to the physical erasing units which store data. For instance, when the memory storage device 100 is formatted by an operating system on the host system 1000 through a file system (e.g., FAT 32), the logical addresses 410(0) to 410(I) are respectively mapped to the physical erasing units in the data area 402. Herein, the memory management circuit 202 establishes a logical address-physical erasing unit mapping table to record a mapping relation between the logical addresses and the physical erasing units. In the present exemplary embodiment, the size of one logical address is equal to the capacity of one physical erasing unit, i.e., the logical address may be referred to as a logical block address (LBA); however, in other exemplary embodiment of the invention, the size of one logical address may also be the capacity of one physical programming unit or any other capacity, which should however not be construed as a limitation to the invention.

According to the present exemplary embodiment, when the memory management circuit 202 configures logical addresses 410(0) to 410(I), the logical addresses 410(0) to 410(I) are alternately mapped to one of the physical erasing units in the memory unit 210 and one of the physical erasing units in the memory unit 220. For instance, the logical address 410(0) is mapped to the physical erasing unit 212(0), the logical address 410(1) is mapped to the physical erasing unit 220(0), the logical address 410(2) is mapped to the physical erasing unit 212(1), and the rest may be deduced therefrom. In other exemplary embodiments, however, the memory management circuit 202 may also map the logical addresses 410(0) to 410(I) to the physical erasing units belonging to the data area 402 in a non-alternate manner or in any other manner, and the invention is not limited thereto.

When the host system 1000 intends to write data into the memory storage device 100, the host system 1000 transmits a writing command to the memory management circuit 202, and the writing command indicates a specific logical address where the data are to be written. For instance, the writing command transmitted by the host system 1000 instructs to write the first data 420 into the logical address 410(0) (also referred to as a first logical address). In other words, the host system 1000 attempts to update data in the physical erasing unit 212(0) (also referred to as a fourth physical erasing unit). After receiving the writing command, the memory management circuit 202 selects one physical erasing unit (also referred to as a third physical erasing unit) from the spare area 404 and writes the first data into the third physical erasing unit. The memory management circuit 202 also re-maps the logical address 410(0) to the third physical erasing unit and associates the third physical erasing unit with the data area 402. What is more, the memory management circuit 202 determines whether the third physical erasing unit is one of the physical erasing units 212(0) to 212(A) in the memory unit 210 or one of the physical erasing units 222(0) to 222(B) in the memory unit 220. If the third physical erasing unit is one of the physical erasing units 212(0) to 212(A) in the memory unit 210 (e.g., if the third physical erasing unit is the physical erasing unit 212(C)), the memory management circuit 202 erases at least one of the physical erasing units in the memory unit 220 while writing the first data 420 into the third physical erasing unit. By contrast, if the third physical erasing unit is one of the physical erasing units 222(0) to 222(B) in the memory unit 220 (e.g., if the third physical erasing unit is the physical erasing unit 222(D)), the memory management circuit 202 erases at least one of the physical erasing units in the memory unit 210 while writing the first data 420 into the third physical erasing unit. That is, while the memory management circuit 202 is writing the first data 420 into one of the memory units 210 and 220, the memory management circuit 202 simultaneously erases at least one of the physical erasing units in the other one of the memory units 210 and 220. Detailed explanations are given below with reference to an exemplary embodiment.

Figure 5:
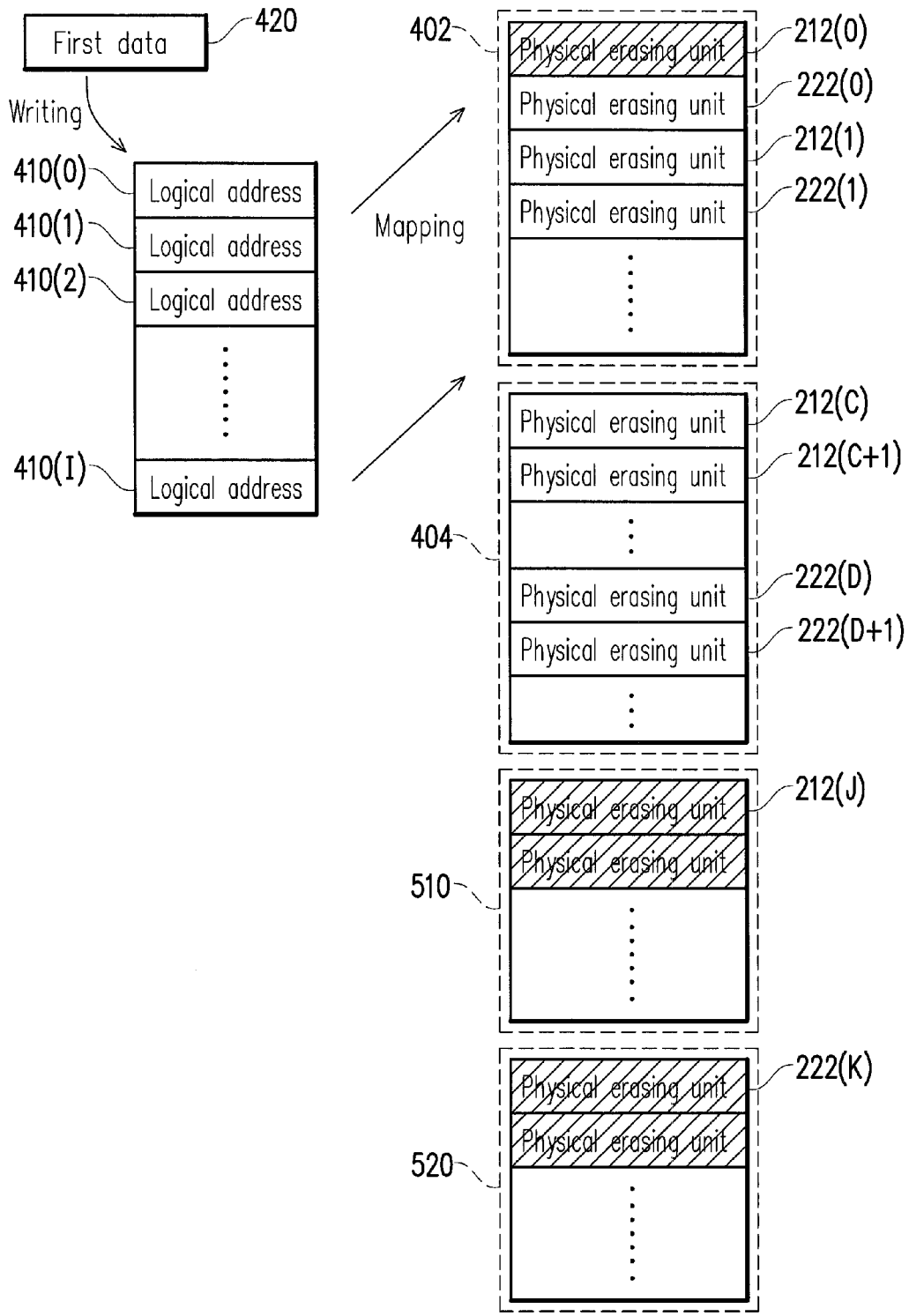
FIG. 5 is a schematic diagram illustrating a first erasing area and a second erasing area according to an exemplary embodiment of the invention.

FIG. 5 is a schematic diagram illustrating a first erasing area and a second erasing area according to an exemplary embodiment of the invention.

With reference to FIG. 5, in addition to the above-mentioned areas, the memory management circuits 202 further logically configures a first erasing area 510 and a second erasing area 520. At the time the memory storage device 100 is being formatted, neither the first erasing area 510 nor the second erasing area 520 has any physical erasing unit. Along with the operation of the memory management circuit 202, the physical erasing units that are required to be erased but are not yet erased are associated with the first erasing area 510 or the second erasing area 520. Note that the first erasing area 510 merely has the physical erasing units belonging to the memory unit 210, and the second erasing area 520 merely has the physical erasing units belonging to the memory unit 220. The memory management circuit 202 may preclude the first erasing area 510 and the second erasing area 520 from having the physical erasing units in excess of a threshold.

As described above, after the first data 420 are written into one of the physical erasing units in the spare area 404, parts of the data in the physical erasing unit 212(0) have become invalid, and the memory management circuit 202 then determines whether the physical erasing unit 212(0) is required to be erased. For instance, given that all data in the physical erasing unit 212(0) have become invalid, the memory management circuit 202 determines that the physical erasing unit 212(0) is required to be erased. If the physical erasing unit 212(0) is required to be erased, the memory management circuit 202 determines whether the physical erasing unit 212(0) corresponds to the first erasing area 510 or the second erasing area 520. Since the physical erasing unit 212(0) described herein belongs to the memory unit 210, the memory management circuit 202 determines that the physical erasing unit 212(0) corresponds to the first erasing area 510. The memory management circuit 202 then determines whether a physical erasing unit number of the first erasing area 510 (i.e. the number of the physical erasing units in the first erasing area 510) is greater than or equal to the threshold. If the physical erasing unit number of the first erasing area 510 is smaller than the threshold, the memory management circuit 202 associates the physical erasing unit 212(0) with the first erasing area 510. In contrast thereto, if the physical erasing unit number of the first erasing area 510 is greater than or equal to the threshold, the memory management circuit 202 erases the physical erasing unit 212(0) and associates the physical erasing unit 212(0) with the spare area 404. Similarly, given that the physical erasing unit (e.g., the physical erasing unit 220(0)) that is required to be erased corresponds to the second erasing area 520, the memory management circuit 202 determines whether the physical erasing unit number of the second erasing area 520 is greater than or equal to the threshold and thereby determines whether to associate the physical erasing unit with the second erasing area 520. Namely, if the physical erasing unit numbers of the first erasing area 510 and the second erasing area 520 are smaller than the threshold, the physical erasing unit that is required to be erased is associated with the first erasing area 510 or the second erasing area 520. By contrast, if the physical erasing unit number of the first erasing area 510 or the second erasing area 520 is greater than or equal to the threshold, the physical erasing unit that is required to be erased is erased and associated with the spare area.

As discussed above, the first erasing area 510 or second erasing area 520 has the physical erasing units that are required to be erased but are not yet erased. Hence, when the memory management circuit 202 writes the first data 420 into the third physical erasing unit in the spare area 404, the memory management circuit 202 selects (from the first erasing area 510 or the second erasing area 520) one of the physical erasing units which is required to be erased but is not yet erased. In particular, if the third physical erasing unit (e.g., the physical erasing unit 212(C)) belongs to the memory unit 210, the memory management circuit 202 erases at least one physical erasing unit in the second erasing area 520. Alternatively, if the third physical erasing unit (e.g., the physical erasing unit 222(D)) belongs to the memory unit 220, the memory management circuit 202 erases at least one physical erasing unit in the first erasing area 510.

In addition, after writing the first data 420 into the third physical erasing unit, the memory management circuit 202 associates one or more physical erasing units which are erased during the writing period with the spare area 404. In an exemplary embodiment of the invention, the memory management circuit 202 alternately associates the erased physical erasing units with the spare area 404 after writing plural data. In particular, after individual data or plural data are written into the physical erasing units in the spare area, the first erasing area 510 may include one or more erased physical erasing units, and the second erasing area 520 may include one or more erased physical erasing units as well. The memory management circuit 202 may select one of the erased physical erasing units from one of the first and second erasing areas 510 and 520 and associate the selected erased physical erasing unit with the spare area 404. The memory management circuit 202 then selects one of the erased physical erasing units from the other one of the first and second erasing areas 510 and 520 and associates the selected erased physical erasing unit with the spare area 404. Nevertheless, according to another exemplary embodiment, in the process of updating system data, the memory management circuit 202 may associate all of the erased physical erasing units in the first erasing area 510 with the spare area 404 or associate all of the erased physical erasing units in the second erasing area 520 with the spare area 404. The time point of updating the system data may be the time point at which the memory management circuit 202 updates the logical address-physical erasing unit mapping table or the time point at which the memory management circuit 202 updates other system data, which should not be construed as a limitation to the invention.

In an exemplary embodiment, the memory management circuit 202 may determine a positive integer n according to a writing speed and an erasing time of the rewritable non-volatile memory module 106. As long as the first data 420 are written into the n physical programming units, the memory management circuit 202 examines whether the first erasing area 510 or the second erasing area 520 has any physical erasing unit that is required to be erased. For instance, given that the required time frame during which the rewritable non-volatile memory module 106 erases one physical erasing unit is 20 ms, and that the required time frame during which the rewritable non-volatile memory module 106 writes data into one physical programming unit is 4 ms, the memory management circuit 202 sets the positive integer n to be 5 or a multiple of 5.

Figure 6A:
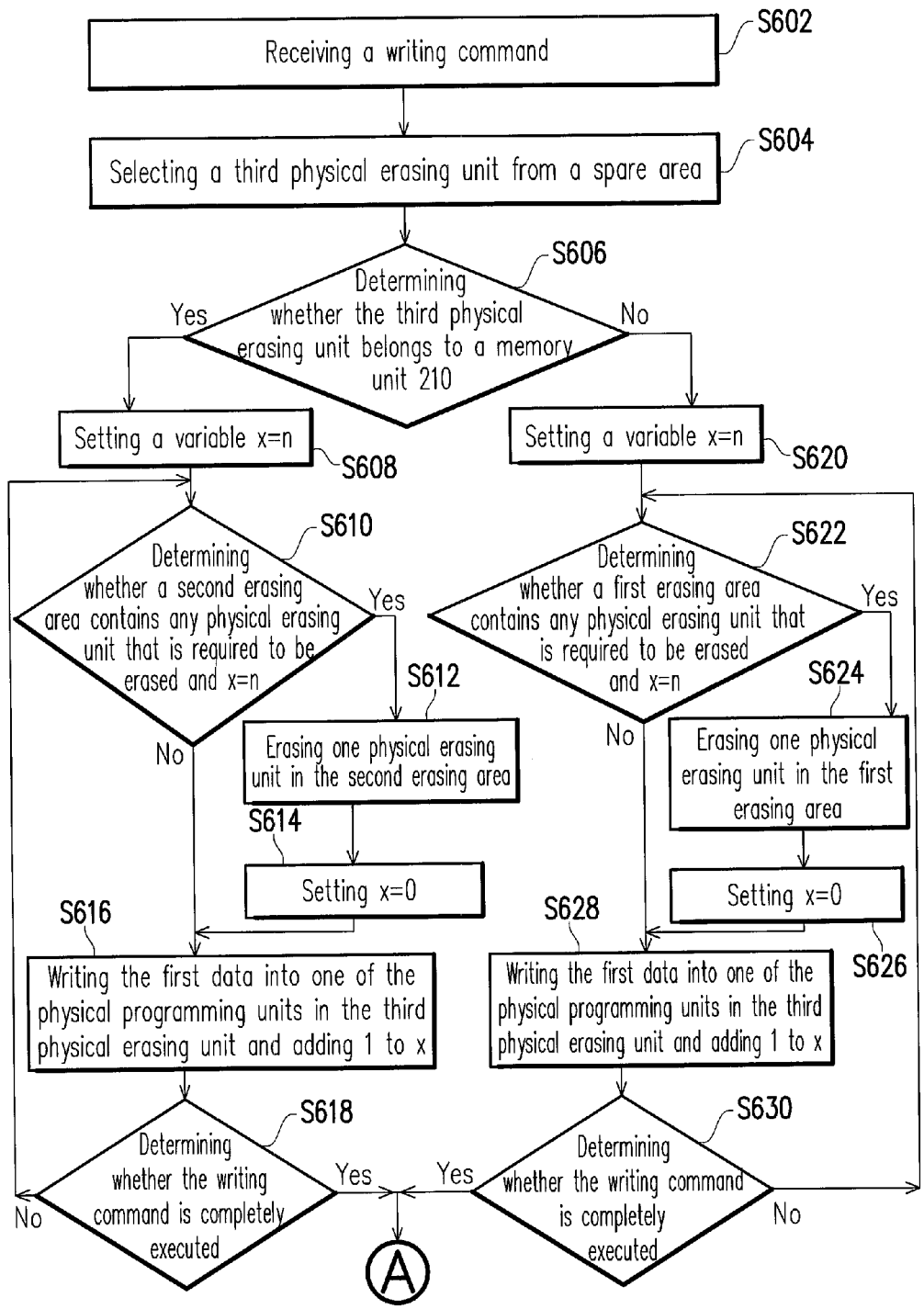
FIG. 6A and FIG. 6B are flowcharts of writing first data according to an exemplary embodiment of the invention.
Figure 6B:
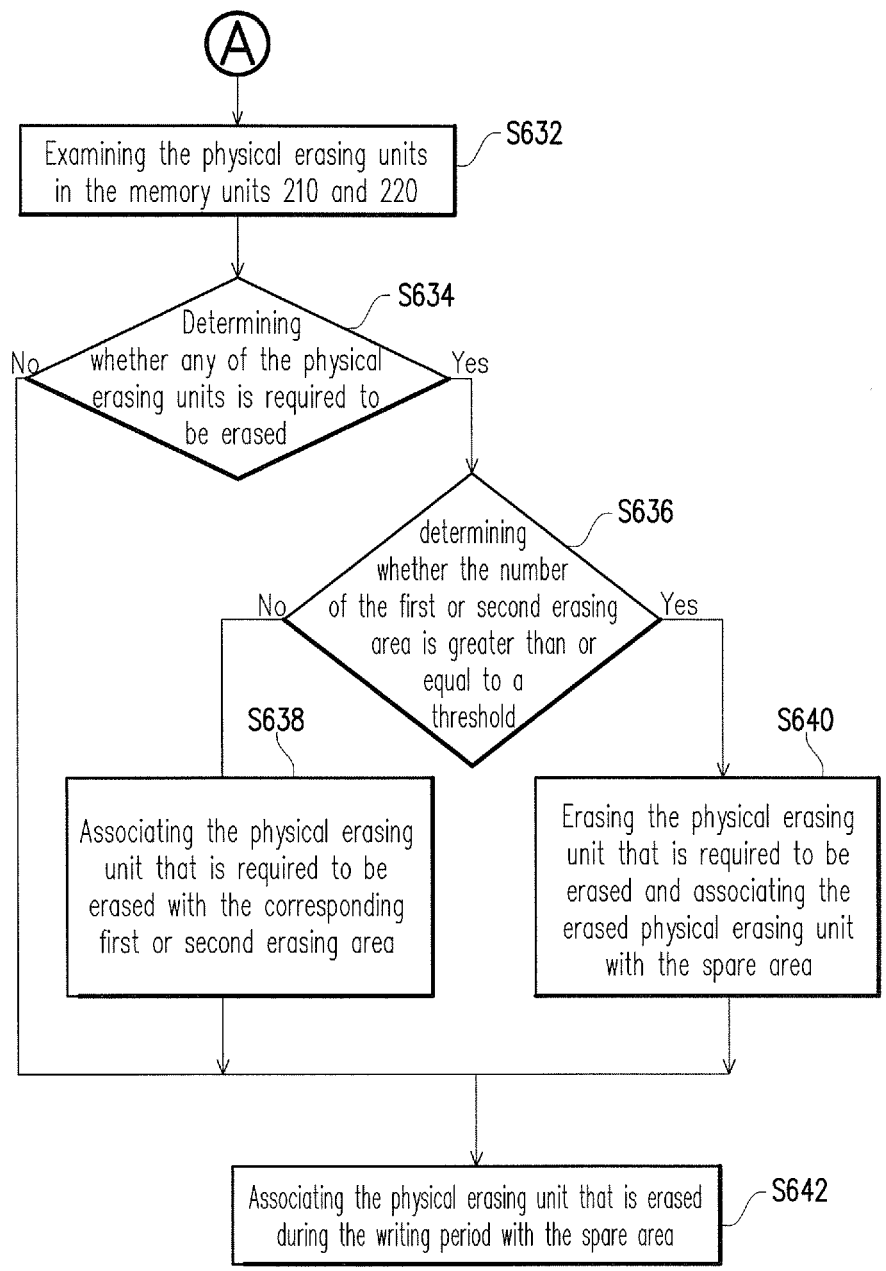

FIG. 6A and FIG. 6B are flowcharts of writing first data according to an exemplary embodiment of the invention.

With reference to FIG. 6A, the memory management circuit 202 receives a writing command which instructs to write first data 420 in step S602 and selects a third physical erasing unit from a spare area 404 in step S604. The memory management circuit 202 determines whether the third physical erasing unit belongs to the memory unit 210 in step S606. If the third physical erasing unit belongs to the memory unit 210, the memory management circuit 202 sets a variable x as a positive integer n in step S608. In step S610, the memory management circuit 202 determines whether a second erasing area 520 contains any physical erasing unit that is required to be erased and the variable x is equal to the positive integer n. If the determination result obtained in the step S610 is affirmative, the memory management circuit 202 erases one of the physical erasing units in the second erasing area 520 (step S612) and sets the variable x as 0 (step S614). In step S616, the memory management circuit 202 writes the first data 420 into one of the physical programming units in the third physical erasing unit and adds 1 to the variable x. In step S618, the memory management circuit 202 determines whether the writing command is completely executed. If not, the memory management circuit 202 returns to the step S610.

If the determination result obtained in the step S606 is negative, i.e., if the third physical erasing unit does not belong to the memory unit 210, the memory management circuit 202 sets the variable x as n in step S620. In step S622, the memory management circuit 202 determines whether the first erasing area 510 contains any physical erasing unit that is required to be erased and the variable x is equal to the positive integer n. If yes, the memory management circuit 202 erases one of the physical erasing units in the first erasing area 510 (step S624) and sets the variable x as 0 (step S626). In step S628, the memory management circuit 202 writes the first data 420 into one of the physical programming units in the third physical erasing unit and adds 1 to the variable x. In step S630, the memory management circuit 202 determines whether the writing command is completely executed. If not, the memory management circuit 202 goes back to the step S622.

With reference to FIG. 6B, the memory management circuit 202 then examines the physical erasing units in the memory units 210 and 220 in step S632 and determines whether any of the physical erasing units is required to be erased in step S634. For instance, as shown in FIG. 5, given that all data in the physical erasing unit 212(0) have become invalid, the memory management circuit 202 determines that the physical erasing unit 212(0) is required to be erased. However, if the first data 420 are to be written into plural physical erasing units, the plural physical erasing units that are required to be erased may also be generated during the writing period. The number of physical erasing units determined in the step S634 is not limited in the invention. If the determination result of the step S634 is affirmative, in step S636, the memory management circuit 202 determines whether the physical erasing unit that is required to be erased corresponds to the first erasing area 510 or the second erasing area 520 and also determines whether the corresponding first erasing area 510 or the second erasing area 520 is fully occupied (i.e., determine whether the number of the physical erasing units in the first erasing area 510 or the second erasing area 520 is greater than or equal to a threshold). If the determination result of the step S636 is affirmative (i.e., the corresponding erasing area is fully occupied), the memory management circuit 202 erases the physical erasing unit that is required to be erased and associates the erased physical erasing unit with the spare area 404 (step S640). If the determination result of the step S636 is negative, the memory management circuit 202 associates the physical erasing unit that is required to be erased with the corresponding first erasing area 510 or the corresponding second erasing area 520 in step S638. Finally, in step S642, the memory management circuit 202 associates the physical erasing unit that is erased during the writing period (i.e., the physical erasing unit erased in the step S612 or in the step S624) with the spare area 404.

Figure 7:
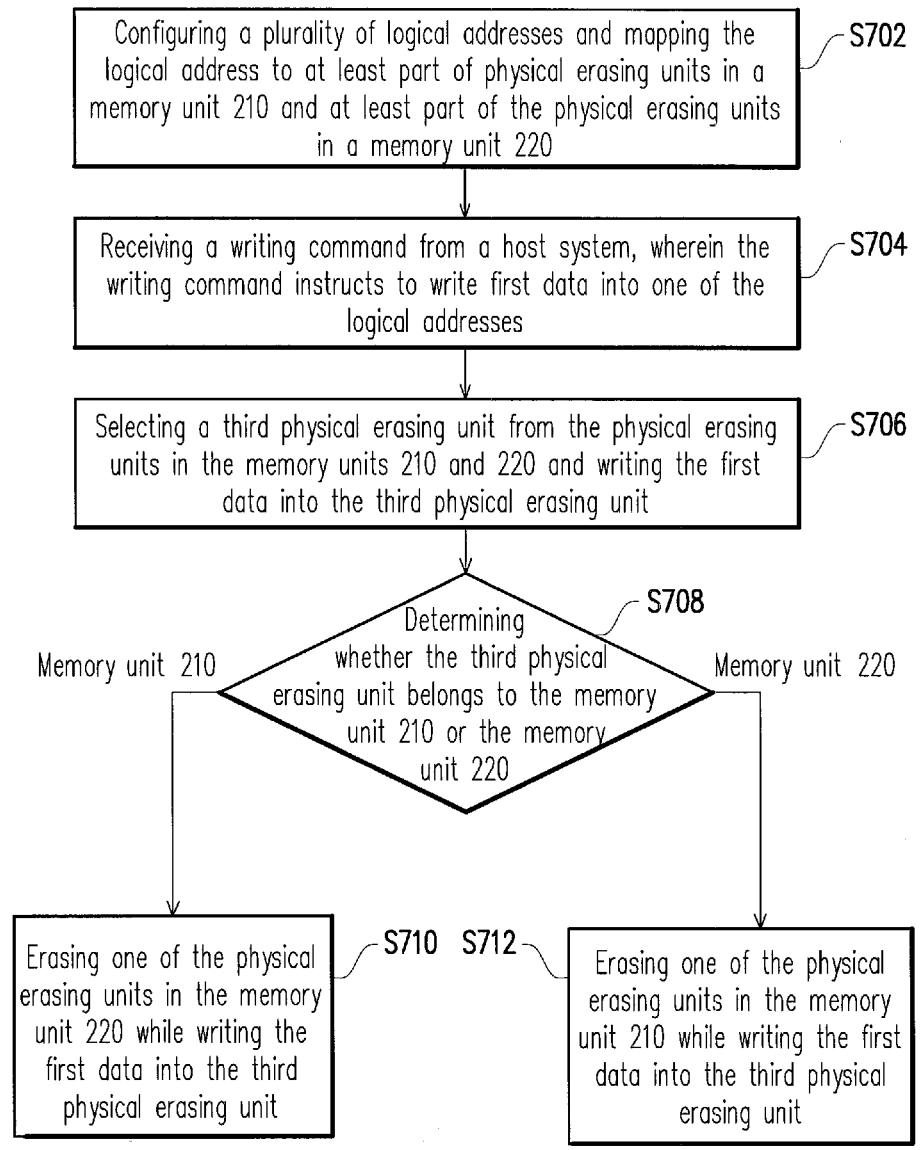
FIG. 7 is a flowchart of a data writing method according to an exemplary embodiment of the invention.

FIG. 7 is a flowchart of a data writing method according to an exemplary embodiment of the invention.

With reference to FIG. 7, in step S702, a plurality of logical addresses are configured and mapped to at least part of the physical erasing units in the memory unit 210 and at least part of the physical erasing units in the memory unit 220.

In step S704, a writing command is received from a host system, wherein the writing command instructs to write first data into one of the logical addresses.

In step S706, a third physical erasing unit is selected from the physical erasing units in the memory units 210 and 220, and the first data are written into the third physical erasing unit.

In step S708, whether the third physical erasing unit belongs to the memory unit 210 or the memory unit 220 is determined.

If the determination result of the step S708 indicates that the third physical erasing unit belongs to the memory unit 210, in step S710, one of the physical erasing units in the memory unit 220 is erased while the first data are written into the third physical erasing unit.

If the determination result of the step S708 indicates that the third physical erasing unit belongs to the memory unit 220, in step S712, one of the physical erasing units in the memory unit 210 is erased while the first data are written into the third physical erasing unit.

Each step shown in FIG. 7 is elaborated above and will no longer be described hereinafter. The steps depicted in FIG. 7 may be implemented in form of program codes executed by a processor (e.g., the memory controller 104). Alternatively, the steps depicted in FIG. 7 may be implemented in form of one or plural circuits, and the invention does not pose any limitation on whether the steps of FIG. 7 are implemented in form of software or hardware. These steps may be implemented according the previous exemplary embodiments or may be performed individually, which should however not be limited in the invention.

As shown in FIG. 2, in the present exemplary embodiment, the rewritable non-volatile memory module 106 includes two memory units, and the writing speed of one of the memory units is greater than the transmission speed of the connector 102. Here, each of the memory units may include one or plural channels. Therefore, the simultaneous data writing and erasing operations free the memory management circuit 202 from spending additional time on performing the data erasing operation after writing the data. In another exemplary embodiment, the rewritable non-volatile memory module 106 may include y memory units, and the writing speed of m memory units is greater than the transmission speed of the connector 102. While the memory management circuit 202 writes data into one of the m memory units, the memory management circuit 202 erases at least one of the physical erasing units in the (y-m) memory units. Here, y and m are positive integers, and m is smaller than y; note that the numeric values of y and m are not limited in the invention.

Second Exemplary Embodiment

The second exemplary embodiment is similar to the first exemplary embodiment, while the difference therebetween is described hereinafter. In the second exemplary embodiment, after receiving the writing command, the memory management circuit 202 analyzes and determines whether the number of the physical programming units which the data writing command is to write is eater than or equal to the positive integer n.

Figure 8A:
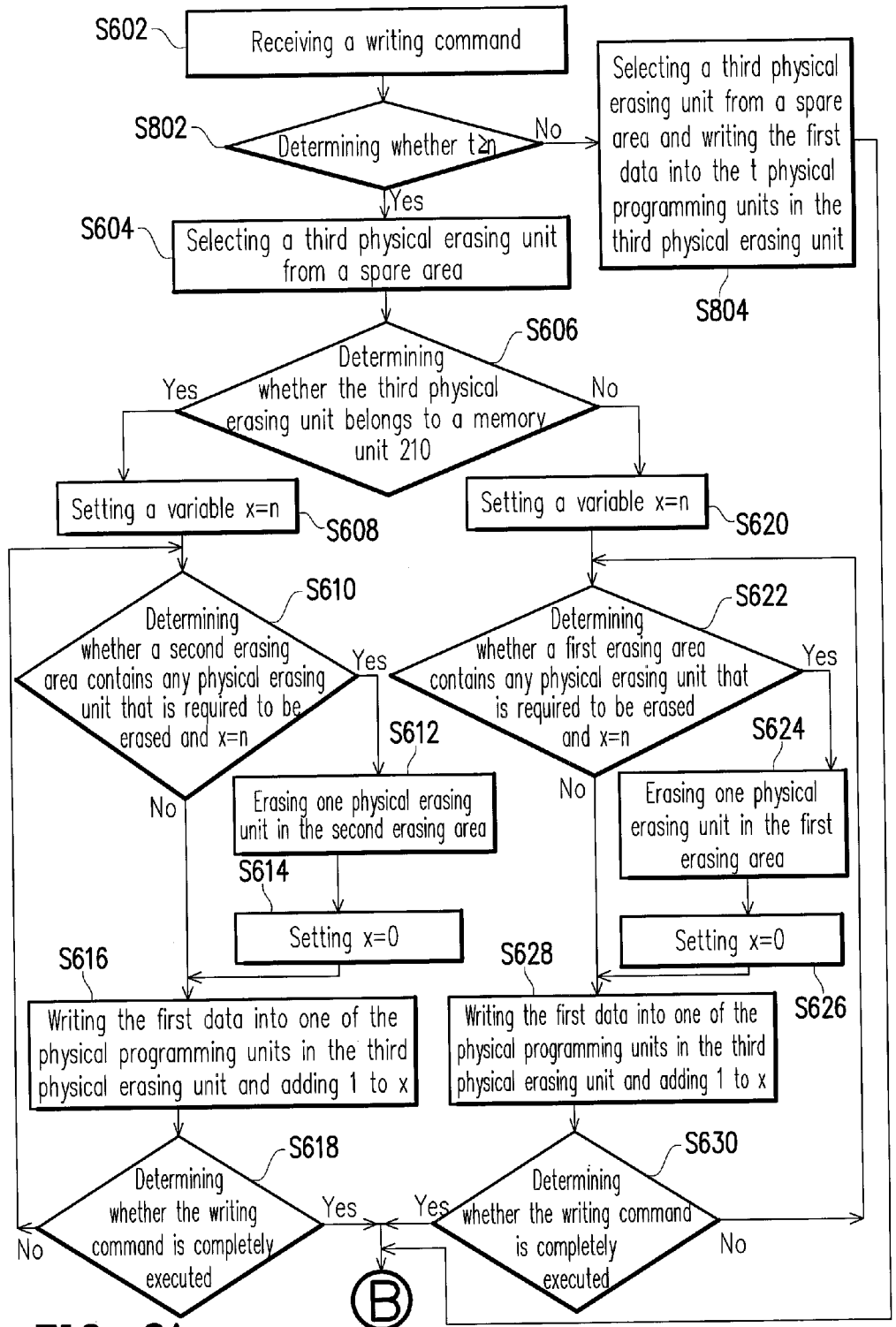
FIG. 8A and FIG. 8B are flowcharts of writing first data according to a second exemplary embodiment of the invention.
Figure 8B:
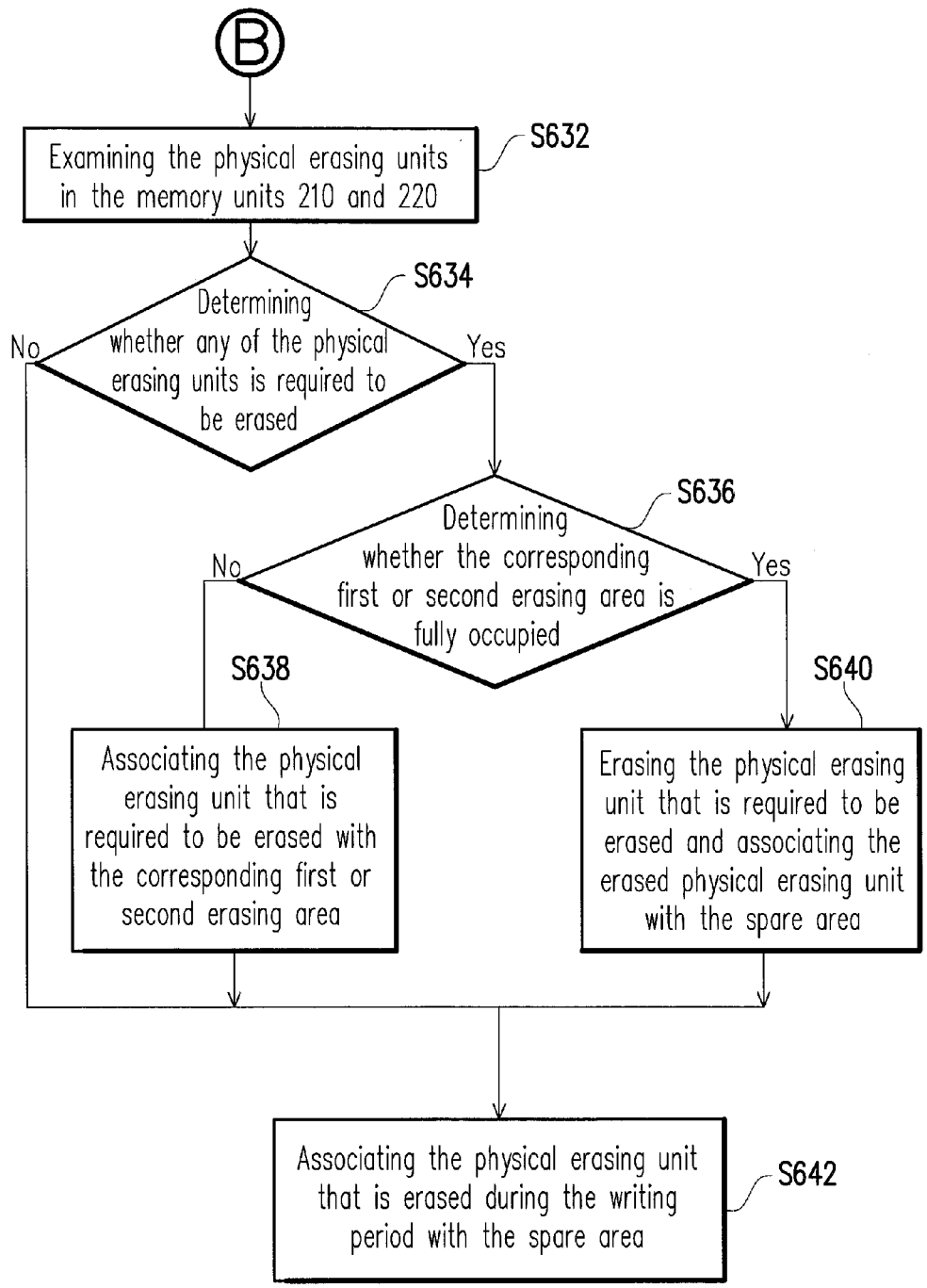

FIG. 8A and FIG. 8B are flowcharts of writing first data according to a second exemplary embodiment of the invention.

With reference to FIG. 8A, in step S602, after the memory management circuit 202 receives the writing command, the memory management circuit 202 analyzes the writing command and learns that the first data are to be written into t physical programming units according to the writing command. Here, t is a positive integer. In step S802, the memory management circuit 202 determines whether the positive integer t is greater than or equal to the positive integer n. If yes, the memory management circuit 202 continues the step S604 as well as the subsequent steps which are the same as those shown in FIG. 6A. If the determination result of the step S802 is negative, in step S804, the memory management circuit 202 selects a third physical erasing unit from the spare area and writes the first data into the t physical programming units in the third physical erasing unit. After the step S804, the memory management circuit 202 continues the subsequent steps shown in FIG. 8B. Since these subsequent steps are the same as those shown in FIG. 6B, they will not be further described hereinafter.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for controlling a rewritable non-volatile memory module, the rewritable non-volatile memory module comprising a first memory unit and a second memory unit, the first memory unit comprising a plurality of first physical erasing units, the second memory unit comprising a plurality of second physical erasing units, the data writing method comprising:
configuring a plurality of logical addresses and mapping the logical addresses to a part of the first physical erasing units of the first memory unit and a part of the second physical erasing units of the second memory unit;
receiving a writing command from a host system, wherein the writing command instructs to write a first data into a first logical address among the logical addresses;
selecting a third physical erasing unit from the first physical erasing units of the first memory unit or the second physical erasing units of the second memory unit;
determining whether the third physical erasing unit belongs to the first memory unit;
if the third physical erasing unit belongs to the first memory unit, erasing a second physical erasing unit among the second physical erasing units of the second memory unit while writing the first data into the third physical erasing unit determined to be belonging to the first memory unit;
if the third physical erasing unit does not belong to the first memory unit, erasing a first physical erasing unit among the first physical erasing units of the first memory unit while writing the first data into the third physical erasing unit;
at least grouping the first physical erasing units of the first memory unit and the second physical erasing units of the second memory unit into a data area and a spare area, wherein the part of the first physical erasing units and the part of the second physical erasing units belong to the data area; and
configuring a first erasing area and a second erasing area, wherein the third physical erasing unit belongs to the spare area, the erased first physical erasing unit among the first physical erasing units of the first memory unit belongs to the first erasing area, and the erased second physical erasing unit among the second physical erasing units of the second memory unit belongs to the second erasing area,
wherein, when a reading, writing, or erasing operation is performed on the first memory, another reading, writing or erasing operation is simultaneously performed on the second memory unit.

2. The data writing method as recited in claim 1, wherein the first logical address is mapped to a fourth physical erasing unit and the fourth physical erasing unit belongs to the first physical erasing units, and after writing the first data into the third physical erasing unit, the data writing method further comprises:
determining whether the fourth physical erasing unit is required to be erased;
if the fourth physical erasing unit is required to be erased, determining whether a physical erasing unit number of the first erasing area is greater than or equal to a threshold; and
if the physical erasing unit number of the first erasing area is not greater than or equal to the threshold, associating the fourth physical erasing unit with the first erasing area.

3. The data writing method as recited in claim 2 further comprising:
if the physical erasing unit number of the first erasing area is greater than or equal to the threshold, erasing the fourth physical erasing unit and associating the fourth physical erasing unit with the spare area.

4. The data writing method as recited in claim 1 further comprising:
associating the erased first physical erasing unit with the spare area or associating the erased second physical erasing unit with the spare area.

5. The data writing method as recited in claim 1, wherein after the first data is written into the third physical erasing unit, the first erasing area comprises a plurality of erased first physical erasing units, the second erasing area comprises a plurality of erased second physical erasing units, and the data writing method further comprises:
alternately associating one of the erased first physical erasing units and one of the erased second physical erasing units with the spare area.

6. The data writing method as recited in claim 1, wherein each of the first physical erasing units comprises a plurality of physical programming units, each of the second physical erasing units comprises a plurality of physical programming units, and the data writing method further comprises:
determining a positive integer n according to a writing speed and an erasing time of the rewritable non-volatile memory module;
after writing the first data into n physical programming units of the physical programming units in the third physical erasing unit, examining whether the first erasing area or the second erasing area has physical erasing units required to be erased; and
if the first erasing area or the second erasing area has physical erasing units required to be erased, erasing one of the second physical erasing units or erasing one of the first physical erasing units.

7. The data writing method as recited in claim 1, wherein each of the first physical erasing units comprises a plurality of physical programming units, each of the second physical erasing units comprises a plurality of physical programming units, the writing command instructs to write t physical programming units, and t is a positive integer, the data writing method further comprising:
determining a positive integer n according to a writing speed and an erasing time of the rewritable non-volatile memory module;
determining whether the positive integer t is greater than or equal to the positive integer n;
if the positive integer t is smaller than the positive integer n, writing the first data into the third physical erasing unit;
if the positive integer t is greater than or equal to the positive integer n, selecting the third physical erasing unit from the first physical erasing units of the first memory unit or the second physical erasing units of the second memory unit, writing the first data into the third physical erasing unit, and determining whether the third physical erasing unit belongs to the first memory unit or the second memory unit.

8. The data writing method as recited in claim 1, wherein the logical addresses are alternately mapped to one of the first physical erasing units and one of the second physical erasing units.

9. A memory storage device comprising:
a connector, configured to couple to a host system;
a rewritable non-volatile memory module, comprising a first memory unit and a second memory unit, wherein the first memory unit comprises a plurality of first physical erasing units, and the second memory unit comprises a plurality of second physical erasing units; and
a memory controller, coupled to the connector and the rewritable non-volatile memory module, wherein the memory controller is configured to configure a plurality of logical addresses and map the logical addresses to a part of the first physical erasing units of the first memory unit and a part of the second physical erasing units of the second memory unit,
wherein the memory controller is further configured to receive a writing command from a host system, wherein the writing command instructs to write first data into a first logical address among the logical addresses,
wherein the memory controller is further configured to select a third physical erasing unit from the first physical erasing units of the first memory unit or the second physical erasing units of the second memory unit,
wherein the memory controller is configured to determine whether the third physical erasing unit belongs to the first memory unit,
if the third physical erasing unit belongs to the first memory unit, the memory controller is further configured to erase a second physical erasing unit among the second physical erasing units of the second memory unit while writing the first data into the third physical erasing unit determined to be belonging to the first memory unit,
if the third physical erasing unit does not belong to the first memory unit, the memory controller is further configured to erase a first physical erasing unit among the first physical erasing units of the first memory unit while writing the first data into the third physical erasing unit,
wherein the memory controller is further configured to at least group the first physical erasing units of the first memory unit and the second physical erasing units of the second memory unit into a data area and a spare area, wherein the part of the first physical erasing units and the part of the second physical erasing units belong to the data area, and
wherein the memory controller is further configured to configure a first erasing area and a second erasing area, wherein the third physical erasing unit belongs to the spare area, the erased first physical erasing unit among the first physical erasing units of the first memory unit belongs to the first erasing area, and the erased second physical erasing unit among the second physical erasing units of the second memory unit belongs to the second erasing area,
wherein, when a reading, writing, or erasing operation is performed on the first memory, another reading, writing or erasing operation is simultaneously performed on the second memory unit.

10. The memory storage device as recited in claim 9, wherein the first logical address is mapped to a fourth physical erasing unit and the fourth physical erasing unit belongs to the first physical erasing units, and after writing the first data into the third physical erasing unit, the memory controller is further configured to determine whether the fourth physical erasing unit is required to be erased,
if the fourth physical erasing unit is required to be erased, the memory controller is further configured to determine whether a physical erasing unit number of the first erasing area is greater than or equal to a threshold, and
if the physical erasing unit number of the first erasing area is not greater than or equal to the threshold, the memory controller is configured to associate the fourth physical erasing unit with the first erasing area.

11. The memory storage device as recited in claim 10, wherein if the physical erasing unit number of the first erasing area is greater than or equal to the threshold, the memory controller is further configured to erase the fourth physical erasing unit and associate the fourth physical erasing unit with the spare area.

12. The memory storage device as recited in claim 9, wherein the memory controller is further configured to associate the erased first physical erasing unit with the spare area or associating the erased second physical erasing unit with the spare area.

13. The memory storage device as recited in claim 9, wherein after the first data is written into the third physical erasing unit, the first erasing area comprises a plurality of erased first physical erasing units, the second erasing area comprises a plurality of erased second physical erasing units, and the memory controller is further configured to alternately associate one of the erased first physical erasing units and one of the erased second physical erasing units with the spare area.

14. The memory storage device as recited in claim 9, wherein each of the first physical erasing units comprises a plurality of physical programming units, each of the second physical erasing units comprises a plurality of physical programming units, and the memory controller is further configured to determine a positive integer n according to a writing speed and an erasing time of the rewritable non-volatile memory module,
wherein the memory controller is further configured to examine whether the first erasing area or the second erasing area has physical erasing units required to be erased after writing the first data into n physical programming units of the physical programming units in the third physical erasing unit,
and if the first erasing area or the second erasing area has physical erasing units required to be erased, the memory controller is further configured to erase one of the second physical erasing units or erase one of the first physical erasing units.

15. A memory controller for controlling a rewritable non-volatile memory module, the memory controller comprising:
a host interface, configured to couple to a host system;
a memory interface, configured to couple to the rewritable non-volatile memory module, wherein the rewritable non-volatile memory module comprises a first memory unit and a second memory unit, the first memory unit comprises a plurality of first physical erasing units, and the second memory unit comprises a plurality of second physical erasing units; and
a memory management circuit coupled to the host interface and the memory interface, wherein the memory management circuit is configured to configure a plurality of logical addresses and map the logical addresses to a part of the first physical erasing units of the first memory unit and a part of the second physical erasing units of the second memory unit, wherein the memory management circuit is further configured to receive a writing command from a host system, wherein the writing command instructs to write first data into a first logical address among the logical addresses, wherein the memory management circuit is further configured to select a third physical erasing unit from the first physical erasing units of the first memory unit or the second physical erasing units of the second memory unit, wherein the memory management circuit is configured to determine whether the third physical erasing unit belongs to the first memory unit, if the third physical erasing unit belongs to the first memory unit, the memory management circuit is further configured to erase a second physical erasing unit among the second physical erasing units of the second memory unit while writing the first data into the third physical erasing unit determined to be belonging to the first memory unit, if the third physical erasing unit does not belong to the first memory unit, the memory management circuit is further configured to erase a first physical erasing unit among the first physical erasing units of the first memory unit while writing the first data into the third physical erasing unit, wherein the memory management circuit is further configured to at least group the first physical erasing units of the first memory unit and the second physical erasing units of the second memory unit into a data area and a spare area, wherein the part of the first physical erasing units and the part of the second physical erasing units belong to the data area, and wherein the memory management circuit is further configured to configure a first erasing area and a second erasing area, wherein the third physical erasing unit belongs to the spare area, the erased first physical erasing unit among the first physical erasing units of the first memory unit belongs to the first erasing area, and the erased second physical erasing unit among the second physical erasing units of the second memory unit belongs to the second erasing area, wherein, when a reading, writing, or erasing operation is performed on the first memory, another reading, writing, or erasing operation is performed on the second memory unit.

16. The memory controller as recited in claim 15, wherein the first logical address is mapped to a fourth physical erasing unit and the fourth physical erasing unit belongs to the first physical erasing units, after writing the first data into the third physical erasing unit, the memory management circuit is further configured to determine whether the fourth physical erasing unit is required to be erased, if the fourth physical erasing unit is required to be erased, the memory management circuit is further configured to determine whether a physical erasing unit number of the first erasing area is greater than or equal to a threshold, and if the physical erasing unit number of the first erasing area is not greater than or equal to the threshold, the memory management circuit is further configured to associate the fourth physical erasing unit with the first erasing area.

17. The memory controller as recited in claim 16, wherein if the physical erasing unit number of the first erasing area is greater than or equal to the threshold, the memory management circuit is further configured to erase the fourth physical erasing unit and associate the fourth physical erasing unit with the spare area.

18. The memory controller as recited in claim 15, wherein after the first data is written into the third physical erasing unit, the first erasing area comprises a plurality of erased first physical erasing units, the second erasing area comprises a plurality of erased second physical erasing units, and the memory management circuit is further configured to alternately associate one of the erased first physical erasing units and one of the erased second physical erasing units with the spare area.

19. The memory controller as recited in claim 15, wherein each of the first physical erasing units comprises a plurality of physical programming units, each of the second physical erasing units comprises a plurality of physical programming units, and the memory management circuit is further configured to determine a positive integer n according to a writing speed and an erasing time of the rewritable non-volatile memory module, wherein the memory management circuit is further configured to examine whether the first erasing area or the second erasing area has physical erasing units required to be erased after writing the first data into n physical programming units of the physical programming units in the third physical erasing unit, and if the first erasing area or the second erasing area has physical erasing units required to be erased, the memory management circuit is further configured to erase one of the second physical erasing units or erase one of the first physical erasing units.

* * * * *